(12) United States Patent
Karnalkar et al.

(10) Patent No.: US 7,672,443 B2
(45) Date of Patent: Mar. 2, 2010

(54) VIRTUAL PRIVATE NETWORK DIALED NUMBER NATURE OF ADDRESS CONVERSION

(75) Inventors: Anup D. Karnalkar, Allen, TX (US); Thomas Alan Hendricks, Newbury Park, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1256 days.

(21) Appl. No.: 11/016,355

(22) Filed: Dec. 17, 2004

(65) Prior Publication Data

US 2006/0147022 A1    Jul. 6, 2006

(51) Int. Cl.
*H04M 7/00* (2006.01)
(52) U.S. Cl. .............................. 379/221.08; 379/220.01
(58) Field of Classification Search .................. 379/221, 379/14, 93.07, 100.12, 112.06, 220.01, 221.08, 379/222.15, 221.15
See application file for complete search history.

(56) References Cited

U.S. PATENT DOCUMENTS

| | | | |
|---|---|---|---|
| 4,348,554 A | 9/1982 | Asmuth | |
| 4,797,913 A | 1/1989 | Kaplan et al. | |
| 4,972,464 A | 11/1990 | Webb et al. | |
| 5,023,904 A | 6/1991 | Kaplan et al. | |
| 5,212,691 A | 5/1993 | Hokari | |
| 5,247,571 A | 9/1993 | Kay et al. | |
| 5,455,855 A | 10/1995 | Hokari | |
| 5,475,749 A | 12/1995 | Akinpelu et al. | |
| 5,483,582 A | 1/1996 | Pugh et al. | |
| 5,490,212 A * | 2/1996 | Lautenschlager | 379/225 |
| 5,515,427 A | 5/1996 | Carlsen et al. | |
| 5,517,562 A | 5/1996 | McConnell | |
| 5,539,817 A | 7/1996 | Wilkes | |
| 5,550,912 A | 8/1996 | Akinpelu et al. | |
| 5,757,894 A | 5/1998 | Kay et al. | |
| 5,892,821 A | 4/1999 | Turner | |
| 5,892,822 A | 4/1999 | Gottlieb et al. | |
| 5,903,639 A | 5/1999 | Lipchock et al. | |
| 5,917,899 A | 6/1999 | Moss et al. | |
| 5,974,133 A | 10/1999 | Fleischer et al. | |
| 5,987,111 A | 11/1999 | Madoch et al. | |
| 6,075,854 A | 6/2000 | Copley et al. | |
| 6,141,409 A * | 10/2000 | Madoch et al. | 379/207.02 |
| 6,442,169 B1 | 8/2002 | Lewis | |
| 6,453,035 B1 * | 9/2002 | Psarras et al. | 379/221.08 |

(Continued)

OTHER PUBLICATIONS

Belcore, Integrated Customer ADvanced Networking (ICAN) Overview, Oct. 1994, Issue 1, 47 pages.

(Continued)

*Primary Examiner*—Fan Tsang
*Assistant Examiner*—Solomon Bezuayehu
(74) *Attorney, Agent, or Firm*—Hanley, Flight & Zimmerman, LLC

(57) ABSTRACT

A method and system for handling identical VPN numbers assigned to multiple companies using a nature of address/number identifier initiated as public. The method includes receiving a query from a switch module to determine routing information for a call initiated by a calling party, the query including dialed digits with a nature of address identifier, and a calling party identifier updating the nature of address identifier associated with dialed digits to a private type code if a VPN coding identifier is determined present, looking up routing information associated with the dialed digits in a look-up table corresponding to the calling party identifier if the nature of address identifier includes the private type code, and transmitting the routing information to the switch module.

12 Claims, 3 Drawing Sheets

U.S. PATENT DOCUMENTS

| | | |
|---|---|---|
| 6,735,209 B1 | 5/2004 | Cannon et al. |
| 6,741,693 B1 * | 5/2004 | Madoch et al. ........ 379/220.01 |
| 6,795,543 B1 | 9/2004 | Cartier et al. |
| 7,190,780 B2 | 3/2007 | Madoch et al. |
| 7,218,722 B1 * | 5/2007 | Turner et al. ........... 379/221.02 |
| 7,356,138 B2 | 4/2008 | Madoch et al. |
| 2002/0136206 A1 | 9/2002 | Gallant et al. |
| 2002/0136388 A1 * | 9/2002 | Fleischer et al. ....... 379/220.01 |
| 2002/0167946 A1 | 11/2002 | Gallant |
| 2004/0151194 A1 | 8/2004 | Cannon et al. |
| 2004/0170269 A1 * | 9/2004 | Madoch et al. ........ 379/221.15 |
| 2005/0114141 A1 * | 5/2005 | Grody ........................ 704/270 |
| 2005/0227670 A1 * | 10/2005 | Bicker ........................ 455/411 |

OTHER PUBLICATIONS

Belcore, Generic Requirements for Integrated Customer Advanced Networking (ICAN) Electronic Tandem Switching (ETS) Services, Jul. 1994, Issue 1, 171pages. [Along with its revised version, 29 pages].

Atoui, Virtual Private Network Call Processing in the Intelligent Network, Supercomm/ICC, vol. 2 of 5, pp. 562-565, Jun. 14, 1992.

"Signaling System 7 (SS7)," www.iec.org, Downloaded, 29 Pages.

* cited by examiner

VIRTUAL PRIVATE NETWORK DIALED NUMBER NATURE OF ADDRESS CONVERSION

BACKGROUND

The world has changed a lot in the last couple of decades. Instead of simply dealing with local or regional concerns, many businesses now have to think about global markets and logistics. Many companies have facilities spread out across the country or around the world. To connect between these facilities these companies have used dedicated private networks, such as a plurality of centrex or private branch exchanges (PBXs) tied together by dedicated lines. These networks, however, require high capital costs and create maintenance headaches.

Virtual private networks (VPNs) have been created to reduce the need for dedicated private networks. A VPN is a software-defined network offering the appearance, functionality and usefulness of a dedicated private network, at a significant price savings.

SUMMARY

More and more companies are establishing VPNs to interconnect their offices. VPN customers can also utilize the 700+7 digits dialing as part of their VPN dial plan. As such, the amount of 700+7 digit numbers used as VPN numbers that are available can become exhausted for any VPN service provider. A need exists to allow identical VPN numbers to be assigned to multiple companies or business groups, thereby creating an inexhaustible amount of VPN numbers.

The present invention provides a method and system for handling identical VPN numbers assigned to multiple companies using a nature of address/number identifier initiated as public. The method can include receiving a query from a switch module to determine routing information for a call initiated by a calling party, the query including dialed digits with a nature of address identifier, a calling party identifier, and then updating the nature of address identifier associated with dialed digits to a private type code if a VPN coding identifier is determined present, looking up routing information associated with the dialed digits in a look-up table corresponding to the calling party identifier if the nature of address identifier includes the private type code, and transmitting the routing information to the switch module. The call can be initiated using a voice over internet protocol device.

The VPN coding identifier can be determined present when a length of the dialed digits equals a predetermined length and a portion of the dialed digits corresponds to the VPN coding identifier. The portion of the dialed digits can be the leading three digits of the dialed digits and the VPN coding identifier can be "7" "0" "0". The calling party identifier is associated with a VPN business group associated with the calling party. The look-up table can be a private number look-up table associated with the VPN business group.

The invention has many advantages. For example, the invention eliminates the requirement to enter a VPN (700)+ seven digit (7D) number in a public number table. Elimination of the VPN+7D number from the public number table allows VPN service requests to bypass a public number lookup table for VPN+7D numbers, thereby allowing identical VPN+7D numbers for multiple VPN customer-specific private number tables. That is, each private number table entry for a VPN+7D number can specify a route set independent of another customer's routing for the same dialed VPN+7D number.

BRIEF DESCRIPTION OF DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

Telecommunications networks use switches to process calls and set-up connections. The switches need to communicate with one another in order to accomplish this function. These communications between switches are known as signaling. A well-known example of signaling is Signaling System #7 (SS7). Signaling is different than the actual user traffic transported over the connections set-up by a call. Signaling is the communications which occur in order to set-up and tear down call connections.

Signaling has attained additional functionality with the evolution of what is called the advanced intelligent network (AIN). In the AIN, switches are supported by external processors and databases. Switches process the signaling they receive to process calls. During this processing, the switch CPU may recognize that it needs the support of external processing or data. To obtain this support, the switch CPU and signaling point will generate a new signaling message to send to an external processor. The new signaling message is known as a query. The external processor will process the query and respond to the same switch with a signal containing additional information to support the switch.

One example of an AIN operation is the VPN initiated call. For VPN calls, a switch will receive a call set-up message including the dialed number. In SS7, this is an initial address message (IAM). The switch would process the IAM until it recognized that the calling party number had a VPN identifier (in this case the originating entity; calling/charge party number), and that the switch would require support from an external database to obtain a standard telephone number or other routing information it can use to route the call. This act of recognition is known as a trigger. The standard telephone number is known colloquially as a plain old telephone service (POTS) number. As such, the switch would generate a signaling message to send to an external database. In SS7, this is a transaction capabilities application part (TCAP) message and is commonly known as a query. The external processor that receives the TCAP query is known as a service control point (SCP). The SCP analyzes the query and typically responds to the switch with the appropriate POTS number or network trunk route information. The switch can then process the call in a conventional fashion.

Generally, the subject invention uses the Advanced Intelligent Network to connect multiple calls from different companies having an identical called number (10 digit). That is, different users from different companies can dial the same number and be connected to an associated number or destination within the user's respective company.

Figure 1:
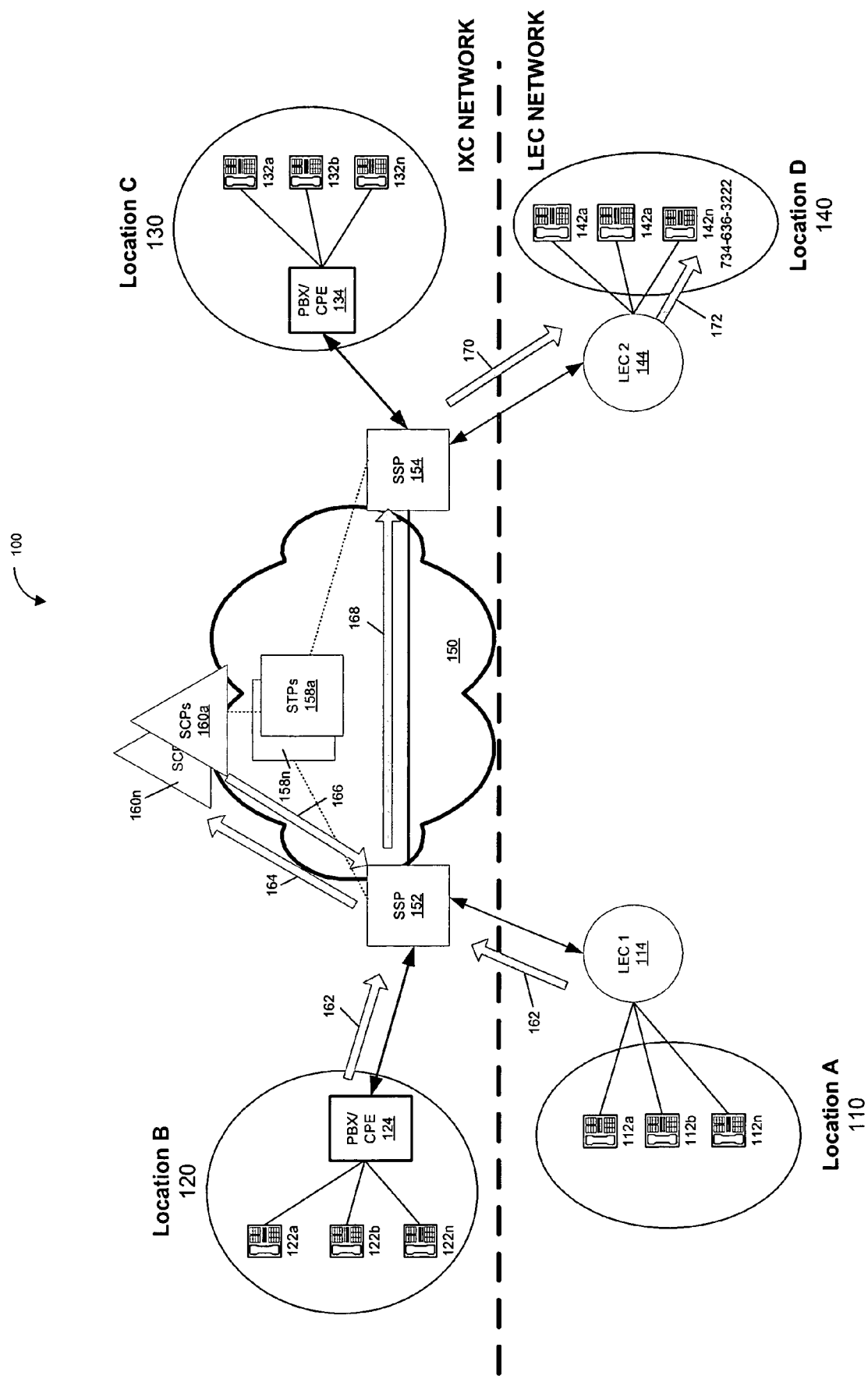
FIG. 1 is a schematic diagram of a network 100 capable of implementing the invention.

FIG. 1 is a schematic diagram of a network 100 capable of implementing the invention. It should be understood that the network 100 is shown for simplicity only. The network 100 consists, for example, of four locations A-D for one company (110, 120, 130, and 140 respectively). Each location (A-D) includes a plurality of telephone devices. For example, location A 110 may include telephone devices 112a ... 112n, location B 120 may include telephone devices 122a ... 122n, location C 130 may include telephone devices 132a ... 132n, and location D 140 may include telephone devices 142a ... 142n. These locations (A-D) are interconnected through the company's chosen interexchange carrier network (IXC) 150 via local exchange carries (LECs) 114, 144 or through private branch exchanges (PBXs) or customer premise equipment (CPE) 124, 134. Interconnection between these locations is known in the art.

In an embodiment, the telephone devices 112, 122, 132, and 142 may be voice over internet protocol (VOIP) devices which connect to the IXC 150 through a VOIP gateway contained within the LECs 114, 144 and or the PBX/CPEs 124, 134.

The IXC 150 includes signal switching points (SSPs) 152, 154 interconnected via an Inter-Machine Trunk (IMT) 168. These SSPs may be for IXC tandem switches for example. The IXC 150 also includes signal transfer points (STPs) 158a ... 158n and signal control points (SCPs) 160a ... 160n. The STPs 158a ... 158n shuttle messages between the SSPs 152, 154 and the SCPs 160a ... 160n. These messages are typically communicated using out of band signaling, such as signaling system 7 (SS7) protocol.

By way of a general example, the user at location A 110 places a call using a telephone 112 to a telephone (or VOIP device) at location D 140, by dialing a ten digit number (e.g., 700-220-4438). Associated with the dialed number are a nature of address/number identifier, and a calling party VPN identifier. The VPN identifier can be the calling party number, a remote access number or a trunk group. Although "700" is used in this example, one skilled in the art would recognize that any number can be used as the VPN identifier.

The LEC 114 (or VOIP gateway) switch routes the dialed number to the SSP 152. The SSP 152 triggers on the VPN identifier and sends a query 164 over the SS7 signal link to the SCP 160. The SCP 160 determines a translated routing number (e.g., 734-636-3222) based on the dialed number and the calling party which is the VPN identifier. The SCP 160 may also determine billing information at this point.

The SCP 160 then sends a response 166 with the billing information and the translated routing number to the SSP 152. The SSP 152 then routes the call over the IMT 168 to the SSP 154.

The SSP 154 then routes 170 the call to the LEC 144 switch. The LEC 144 switch then routes the call to the called party 734-636-3222 at location D 140 on telephone 142n (or VOIP device).

Figure 2A:
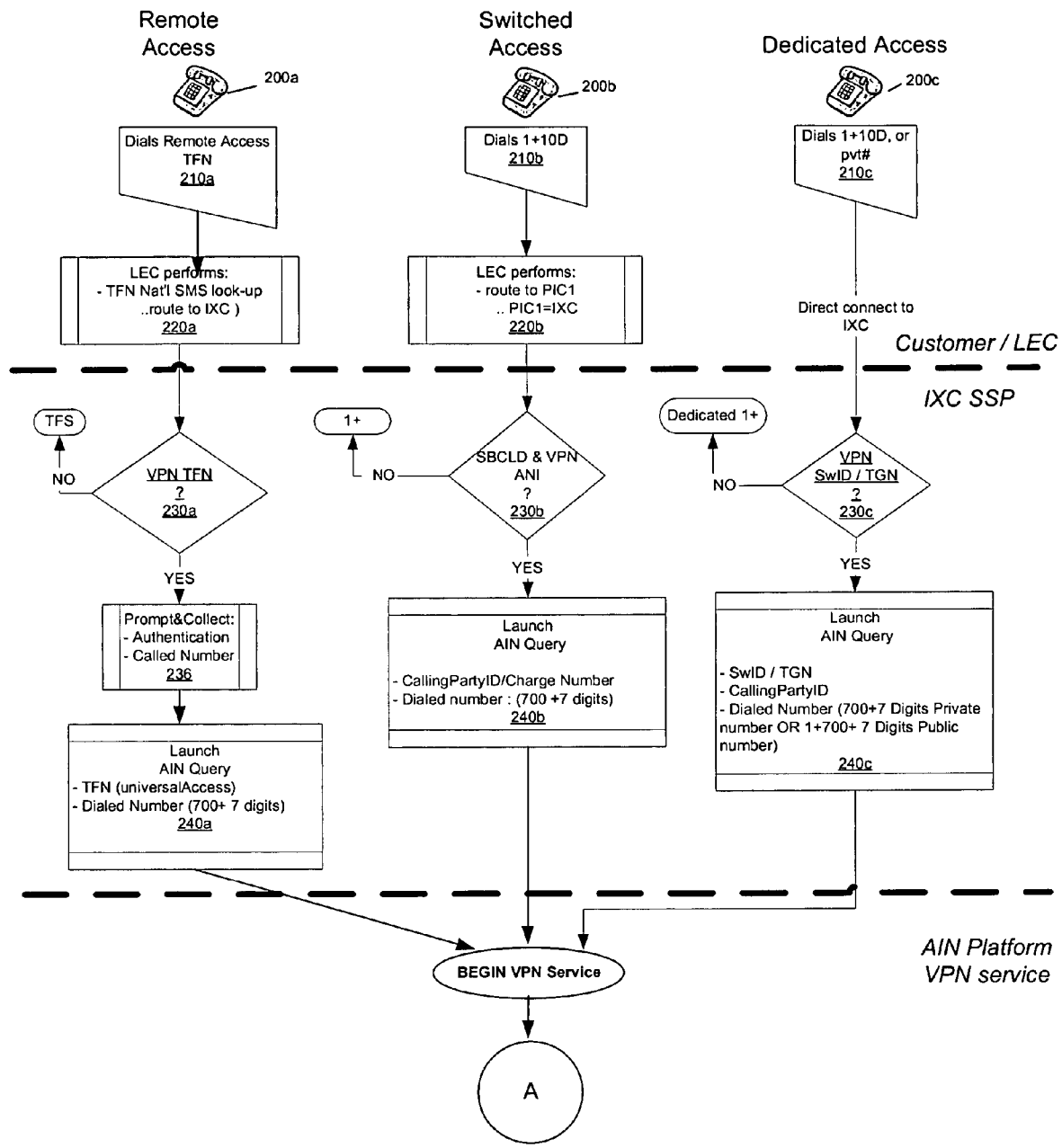
FIGS. 2A and 2B illustrate a flow chart of an embodiment of the steps of the invention performed from call initiation to call termination.
Figure 2B:
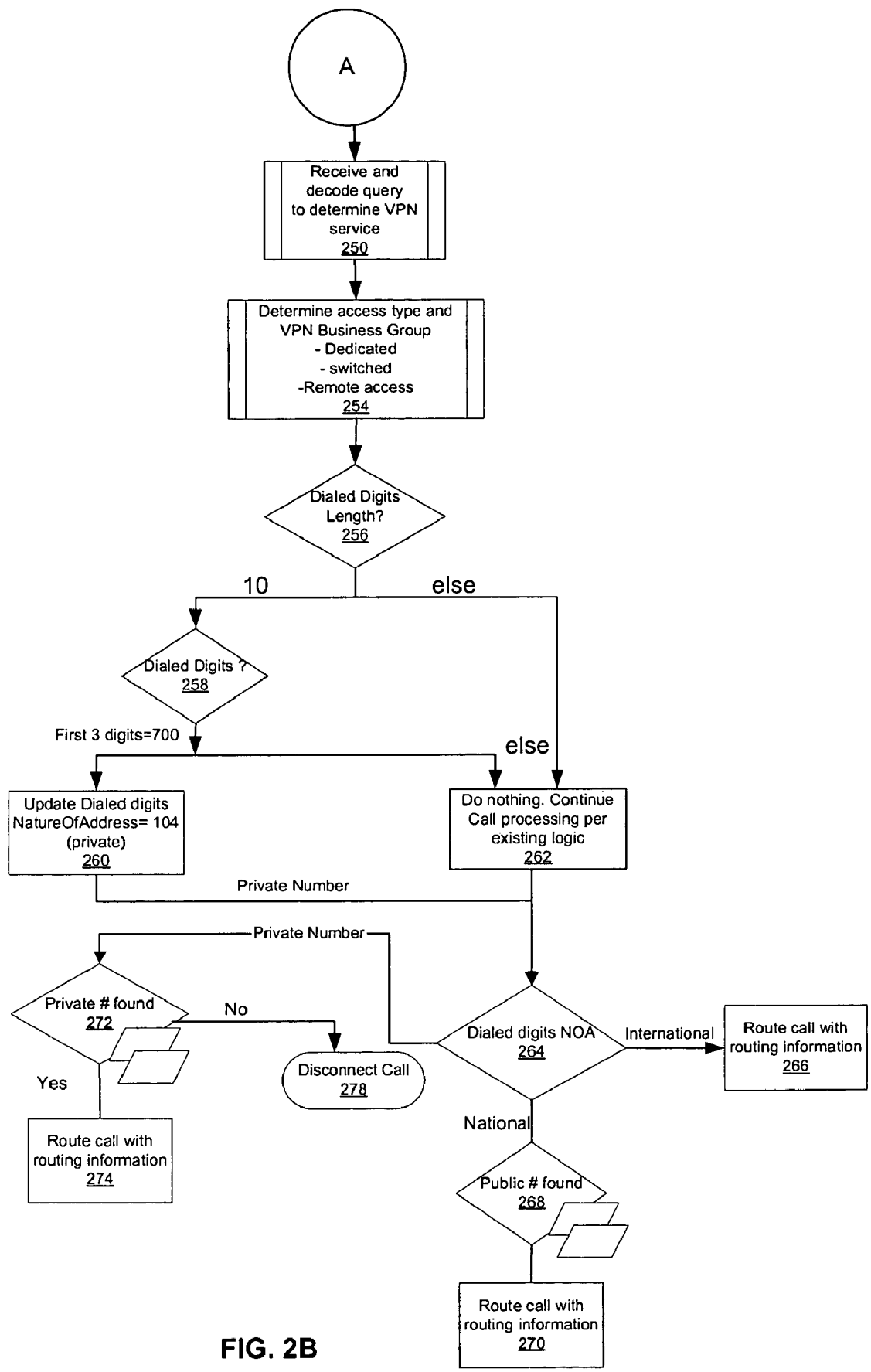

FIG. 2A and 2B is a flow chart of an embodiment of the steps performed from call initiation to call termination. Three types of access are shown: remote access 200a, switched access 200b, and dedicated access 200c. VOIP access is well known in the art and is not shown for simplicity.

For remote access 210a, the LEC (114 FIG. 1) receives an off-hook signal. The LEC then sends a dial tone to the originating telephone. A customer dials a remote access number which includes a plurality of dialed digits (e.g. 800-555-1234). The remote access number may be a toll free number (TFN). The LEC receives the plurality of dialed digits (e.g. 800-555-1234) at step 210a. The LEC then performs a lookup in a TFN national service management system (SMS) database to determine routing information associated with the dialed digits at step 220a. The LEC then routes the call to the appropriate IXC (SSP 152, FIG. 1). The SSP determines if the customer is requesting VPN service at step 230a. The customer is prompted for an authentication number and if authenticated, the called number (e.g., 700-220-4438) at step 236. The SSP then launches a query to the SCP (160 FIG. 1) requesting routing information at step 240a. The SCP may be an advanced intelligent network (AIN). The query may include the TFN or universal access number and the called number. The remaining process will be discussed below with reference to FIG. 2B.

For switched access 210b, the LEC (114 FIG. 1) receives an off-hook signal. The LEC then sends a dial tone to the originating telephone. A customer dials a plurality of dialed digits (e.g. 1-700-220-4438). The LEC receives the plurality of dialed digits (e.g. 1-700-220-4438) at step 210a. Information included in the call setup is a calling party identifier and a called party number with a nature of address/number identifier. The LEC then determines which primary interexchange carrier (PIC) is associated with the call at step 220b. The LEC then routes the call to the associated IXC (SSP 152, FIG. 1). The SSP determines if the customer is requesting VPN service at step 230b. The determination is based on an IXC identifier, for example SBC Long Distance (SBCLD), and VPN automatic number identification (ANI). If SBCLD and VPN ANI are present, the SSP launches a query to the SCP (160 FIG. 1) requesting routing information at step 240b. The SCP may be an advanced intelligent network (AIN). The query may include the calling party identification/charge number and the dialed number (e.g. 700-220-4438) with a nature of address/number identifier (public). The remaining process will be discussed below with reference to FIG. 2B.

For dedicated access 210c, the IXC (SSP 152 FIG. 1) receives an off-hook signal. The IXC then sends a dial tone to the originating telephone. A customer dials a plurality of dialed digits (e.g. 1-700-220-4438). The IXC receives the plurality of dialed digits (e.g. 1-700-220-4438) at step 210c. Information included in the call setup is a calling party identifier and a called party number with a nature of address/number identifier. The IXC determines if the customer is requesting VPN service at step 230c. The determination is based on a VPN identifier and switch identification (SwID)/trunk group number (TGN) identifier. If VPN and SwID/TGN are present, the IXC launches a query to the SCP (160 FIG. 1) requesting routing information at step 240c. The SCP may be an advanced intelligent network (AIN). The query may include the SwID/TGN, the calling party identifier, and the dialed number (e.g. 700-220-4438). The dialed number may be a private number or a public number associated with the nature of address/number identifier. The remaining process will be discussed below with reference to FIG. 2B.

As shown in FIG. 2B, the SCP receives and decodes the query to determine the type VPN service at step 250. The SCP then determines if the call was originated from a remote location, a switched location, or a location having dedicated access and what VPN group is associated with the dialed number at step 254. The VPN group is determined from the calling party identifier. The dialed digits are then examined to determine the length of digits at step 256. If the length of digits equals a predetermined length, e.g., ten, then the dialed digits are further examined to determine if the digits contain a VPN identifier at step 258. If the length of digits does not equal ten or include a VPN identifier then the call is processed using existing logic at step 262. If the dialed digits include a VPN identifier, the nature of address/number (NOA) associated with the dialed digits is updated to be a private number at step 260. One example of a VPN identifier is the leading three digits or area code being "7" "0" "0".

The NOA for the dialed digits is then reexamined to determine if the NOA is associated with an international number, a public number, or a private number at step 264. If the NOA is associated with an international number the call is routed to the SSP with the international routing information at step 266. If the NOA is associated with a public number, a public number table is searched to locate the routing number associated with the dialed number (e.g. 800-555-1212) at step 268 and the call is routed to the SSP with the public routing information at step 270. The public number table is a database containing routing information related to numbers associated with a public number NOA.

If the NOA is associated with a private number, a private number table associated with the VPN group is searched to locate the routing number associated with the dialed number (e.g. 700-220-4438) at step 272. As explained above, the VPN group is determined from the calling party identifier. If the routing number is found in the private number table the call is routed to the SSP with the private routing information at step 274. If no number is found the call is disconnected at step 278.

In the particular example illustrated in FIG. 1, the dialed number (e.g. 700-220-4438) has been assigned to a particular customer for locations A-D. The particular customer also has an assigned VPN group. For this VPN group, the routing number is found in the private number table of the corresponding VPN group and is 734-636-3222. It should be understood that for a different VPN group, the lookup occurs with respect to a different private number table, yielding a different routing number for the identical dialed digits. Thus, multiple companies can use identical VPN (700) numbers simultaneously.

The updating of the NOA to a private number allows VPN calls to be linked to a private number table based the calling party identification. This effectively increases the amount of VPN number availability to an inexhaustible amount, now allowing identical numbers to be assigned to multiple companies. If the NOA is not updated there would be potential duplicate numbers in the public number table and thus call routing would fail because duplicates are not allowed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining routing for virtual private network (VPN) numbers, comprising:

receiving a query from a switch module to determine routing information for a call initiated by a calling party, the query including dialed digits, a nature of address (NoA) attribute, and a calling party identifier;

determining whether the dialed digits include a VPN coding identifier;

modifying the NoA attribute to a private type code when the dialed digits include the VPN coding identifier;

selecting a private VPN number look-up table from a plurality of private VPN number look-up tables based on the calling party identifier, the plurality of private VPN number look-up tables associated with different VPN groups;

looking up the routing information associated with the dialed digits in the selected private VPN number look-up table when the NoA attribute comprises the private type code; and transmitting the routing information to the switch module, the routing information comprising the NOA attribute.

2. The method of claim 1, wherein determining whether the dialed digits include the VPN coding identifier comprises:

comparing a length of the dialed digits to a threshold; and based on a result of the comparison and a portion of the dialed digits, selecting the VPN coding identifier.

3. The method of claim 2, wherein the portion of the dialed digits is the leading three digits of the dialed digits and the VPN coding identifier comprises the digits "7" "0" "0".

4. The method of claim 1, wherein the calling party identifier is associated with a VPN group.

5. The method of claim 4, wherein the selected private VPN number look-up table is associated with the VPN group.

6. An apparatus for determining routing for virtual private network (VPN) numbers, comprising:

a receiving module to receive a query from a switch module to determine routing information for a call initiated by a calling party, the query including dialed digits, a calling party identifier, and a nature of address (NoA) attribute;

a look-up module to determine whether the dialed digits including a VPN coding identifier, to modify the NoA attribute to a private type code when the dialed digits include the VPN coding identifier, select a private VPN number look-up table from a plurality of private VPN number look-up tables based on the calling party identifier, and to perform a lookup within the selected private VPN number look-up table based on a portion of the dialed digits, the lookup to identify the routing information associated with the dialed digits, the plurality of private VPN number look-up tables associated with different VPN groups; and a transmitting module to transmit the routing information to the switch module.

7. The apparatus of claim 6, wherein the calling party identifier is associated with a VPN group.

8. The apparatus of claim 7, wherein the private VPN number look-up table is associated with the VPN group.

9. An article of manufacture storing machine accessible instructions that, when executed, cause a machine to:

receive a query from a switch module to determine routing information for a call initiated by a calling party, the query including dialed digits, a nature of address (NOA) attribute, and a calling party identifier;

determine whether a VPN coding identifier is present in the dialed digits;

modify the NOA attribute to a private type code when the VPN coding identifier is determined present;

select a private VPN number look-up table from a plurality of private VPN number look-up tables based on the calling party identifier, the each of the plurality of private VPN number look-up tables associated with a respective VPN group;

lookup routing information in the selected private VPN number look-up table based on the dialed digits when the NOA attribute comprises the private type code; and transmit the routing information to the switch module.

10. The apparatus of claim 6, wherein performing the lookup of the routing information associated with the dialed digits in the selected private VPN number look-up table comprises performing a query of the selected private VPN number look-up table based on a portion of the dialed digits.

11. The method of claim 1, further comprising looking up the routing information associated with the dialed digits in a public number look-up table when the NoA attribute does not include the private type code.

12. The article of manufacture of claim 9, wherein the machine readable instructions, when executed, cause the machine to lookup the routing information based on a portion of the dialed digits.

* * * * *